(12) United States Patent
Cheng et al.

(10) Patent No.: US 8,164,703 B2
(45) Date of Patent: Apr. 24, 2012

(54) OPTICAL MODULE AND POSITIONING FRAME THEREOF

(75) Inventors: Chi-Chen Cheng, Chang Hua Hsien (TW); Che-Chih Chang, Miaoli County (TW)

(73) Assignee: AU Optronics Corp., Hsinchu (TW)

( * ) Notice: Subject to any disclaimer, the term of this patent is extended or adjusted under 35 U.S.C. 154(b) by 1684 days.

(21) Appl. No.: 11/486,180

(22) Filed: Jul. 14, 2006

(65) Prior Publication Data

US 2007/0014078 A1 Jan. 18, 2007

(30) Foreign Application Priority Data

Jul. 15, 2005 (TW) .............................. 94124039 A

(51) Int. Cl.
*G02F 1/1333* (2006.01)
*G02F 1/1335* (2006.01)
*F21V 7/04* (2006.01)
(52) U.S. Cl. ............. 349/58; 349/61; 362/632; 362/633
(58) Field of Classification Search .................... 349/58, 349/61; 362/632–633
See application file for complete search history.

(56) References Cited

U.S. PATENT DOCUMENTS

2003/0231499 A1* 12/2003 Kao ............................. 362/362

FOREIGN PATENT DOCUMENTS

| CN | 1779516 | 5/2006 |
|----|---------|--------|
| TW | 581264 Y | 3/2004 |

* cited by examiner

*Primary Examiner* — Nathanael R Briggs
(74) *Attorney, Agent, or Firm* — Birch, Stewart, Kolasch & Birch, LLP

(57) ABSTRACT

An optical module with an optical film and a positioning frame is disclosed. The positioning frame firmly fixes the optical film of the optical module so as to prevent the deviation of the optical film. The optical film has at least a first lug with a base portion and an expansion portion extending outwardly, wherein the width of the expansion portion is wider than the base portion. The positioning frame has a side wall and a flange. The flange is disposed on the side wall and has a first opening. The flange located at one side of the first opening has a first protrusion extending outwardly the side wall on the two sides of the first opening. The first opening is used to contain the base portion of the first lug, and the expansion portion of the first lug can be disposed under the first protrusion.

10 Claims, 6 Drawing Sheets

OPTICAL MODULE AND POSITIONING FRAME THEREOF

BACKGROUND OF THE INVENTION

1. Field of the Invention

The invention relates to an optical module, and more particularly to an optical module with a positioning frame.

2. Description of the Prior Art

A liquid crystal display (LCD) is composed of two major parts, a backlight module and an LCD panel. The backlight module is utilized for providing uniform and steady illumination. The LCD panel is assembled on the illumination surface of the backlight module. By controlling the tilting angle of the LC (liquid crystal) molecules within the LCD panel, the optical transmission of the pixels within the LCD panel is adjusted to show the image.

As mentioned above, the illumination of the LCD is provided by the backlight module. Therefore, brightness, uniformity, contrast, and viewing angle of a LCD are deeply influenced by the characteristics of the backlight module.

In addition, various optical films, such as diffuser or prism sheet, are usually provided on the backlight to enhance the illumination distribution of the backlight module and also improve the image quality of the LCD.

FIG. 1 illustrates a schematic view of an optical film mounting on a frame of a conventional backlight module. There are two protrusions 101 on one side of an optical film 10, and each of the protrusions 101 includes a positioning hole. There are two positioning pillars 111 disposed on a frame 11. By penetrating the positioning pillars 111 through the positioning holes, and then fastened by a clip, the optical film 10 is thus fixed on the frame 11.

However, since another side of the optical film 10 is not properly fixed, the optical film can be easily shifted due to external forces and thus damages the optical film 10.

With reference to FIG. 2, which illustrates a schematic view of an optical film mounting on a frame of a backlight module of another prior art.

As shown in FIG. 2, two sides of the optical film 10 have two protrusions 101 respectively. The frame 11 has two positioning slots 112 on one side thereof. After inserting the protrusions 101 into the positioning slots 112, the other side of protrusions 101 is then fixed on the frame 11 through clips or adhesive.

However, in such construction, only the protrusions 101 on one side of the optical film 10 are lodged in the positioning holes 112, sliding caused by horizontal movement occurs easily. Moreover, the protrusions 101 snap easily while inserting into the positioning slots 112, and thus damage or even deform the optical film.

With reference to FIG. 3, which illustrates a schematic view of an optical film mounting on a frame of a backlight module of another prior art.

As shown in FIG. 3, the frame 11 has two hook protrusions 113. Two sides of the optical film 10 have two protrusions 101 respectively, and the protrusions 101 on one side of the optical film 10 have two fixing holes corresponding to the hook protrusions 113.

After inserting the hook protrusions 13 through the positioning holes of the protrusions 101, clips or adhesive are then applied to fix the other side of protrusions 101 on the frame 11 corresponding to a side with the hook protrusions 13. By means of the extending outwardly hooks of the hook protrusions 113, the optical film 10 is not taken off.

However, there still exists several disadvantages within the related art:

1. The hook protrusion can't prevent the optical film from slipping in the direction perpendicular to the light emitted surface.

2. The existence of the hook protrusions will apparently increase the thickness of the backlight module, and this violates the tendency of slim volume.

SUMMARY OF THE INVENTION

It is an object of the present invention to provide an optical module with a positioning frame, wherein the positioning frame is capable of firmly fixing an optical film from deviation.

The optical module in accordance with the present invention comprises an optical film and a positioning frame; wherein the optical film has a first lug, the first lug comprises a base portion and an expansion portion, and the expansion portion is wider than the base portion; and the positioning frame has a side wall and an flange, the flange formed on the side wall has a first opening, the flange located at least one side of the first opening has a first protrusion extending outwardly the side wall on the two sides of the first opening; the first opening is used to contain the base portion of the first lug and the expansion portion of the first lug can be disposed under the first protrusion.

The positioning frame can fix the optical film of the optical module tightly to prevent the optical film from deviating. The optical film has at least a first lug comprising a base portion and an expansion portion that extends outwardly and is wider than the base portion. The positioning frame has a side wall and a flange. The flange is disposed on the side wall and has a first opening. The flange located at one side of the first opening further has a first protrusion extending outwardly the side wall. The first opening is used to contain the base portion of the first lug and the expansion portion of the first lug can be disposed under the first protrusion.

As the present invention described above, an optical module with a positioning frame is easily and conveniently assembled, and further that it restricts the movement of the optical film along three axles effectively. Only one side of the optical film having two lugs can just achieve the goal of effective fixing so as to decrease the possibilities of light spilling from the lugs and save the manufacturing cost.

BRIEF DESCRIPTION OF THE DRAWINGS

The present invention is now specified with reference to its preferred embodiment illustrated in the drawings, wherein.

DESCRIPTION OF THE PREFERRED EMBODIMENT

Figure 1:
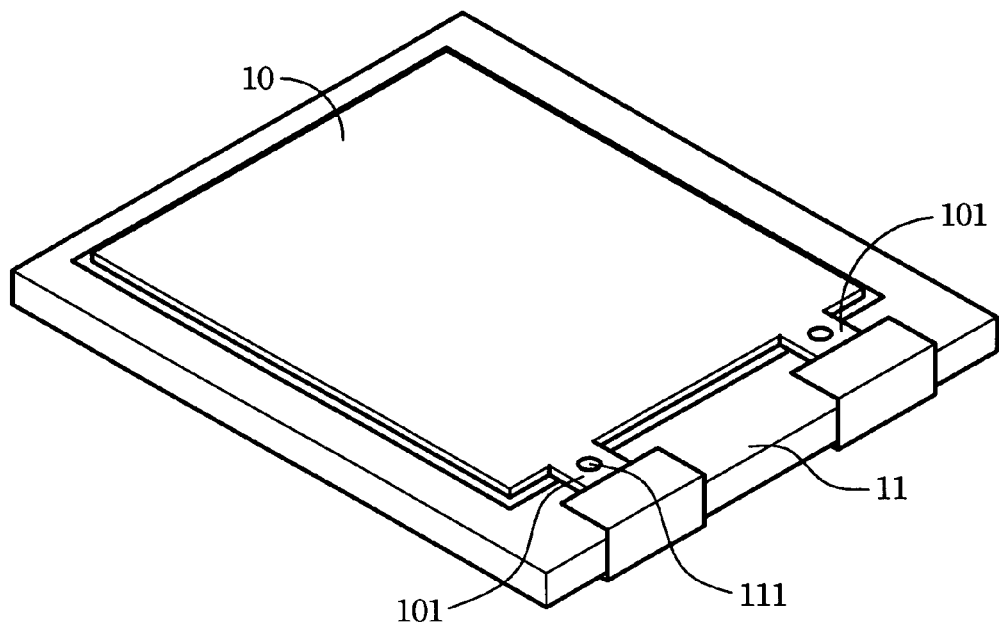
FIG. 1 illustrates a schematic view of an optical film mounting on a frame of a conventional backlight module.
Figure 2:
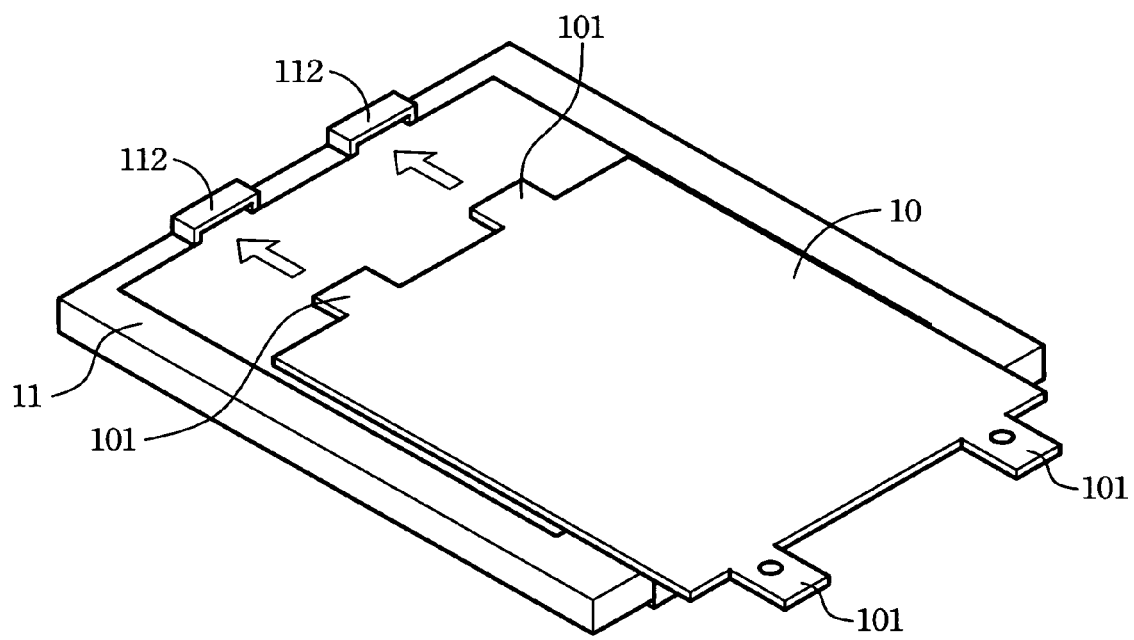
FIG. 2 illustrates a schematic view of the optical film mounting on the frame of another conventional backlight module.
Figure 3:
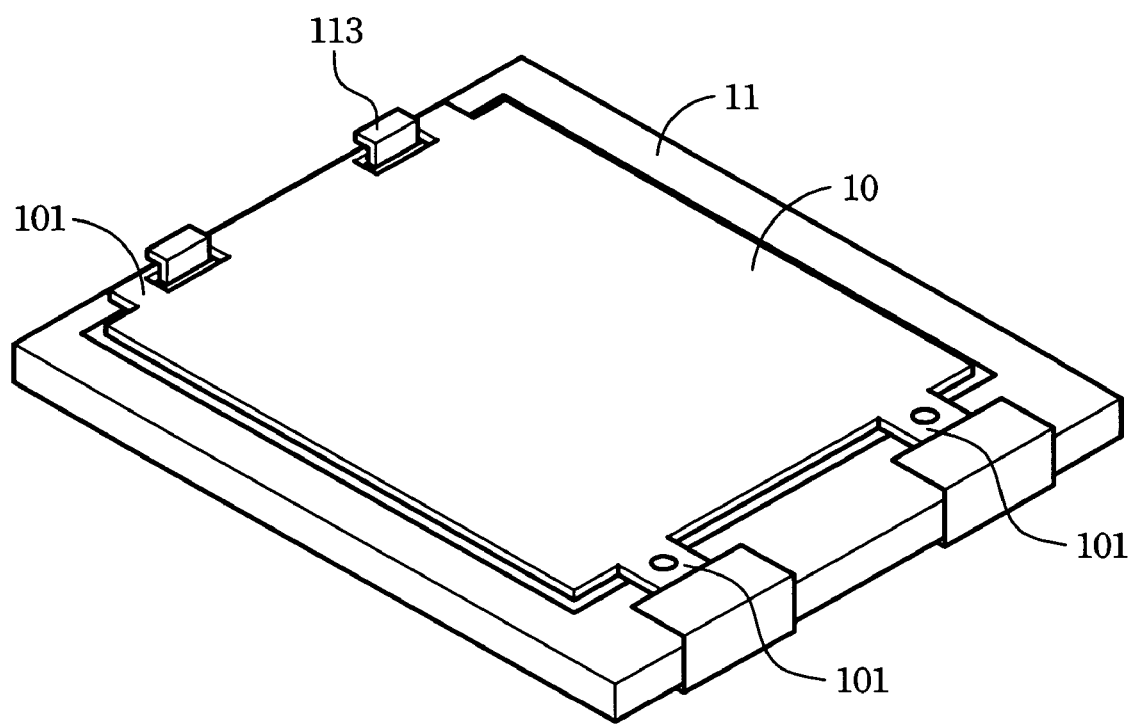
FIG. 3 illustrates a schematic view of the optical film mounting on the frame of still another conventional backlight module.
Figure 4:
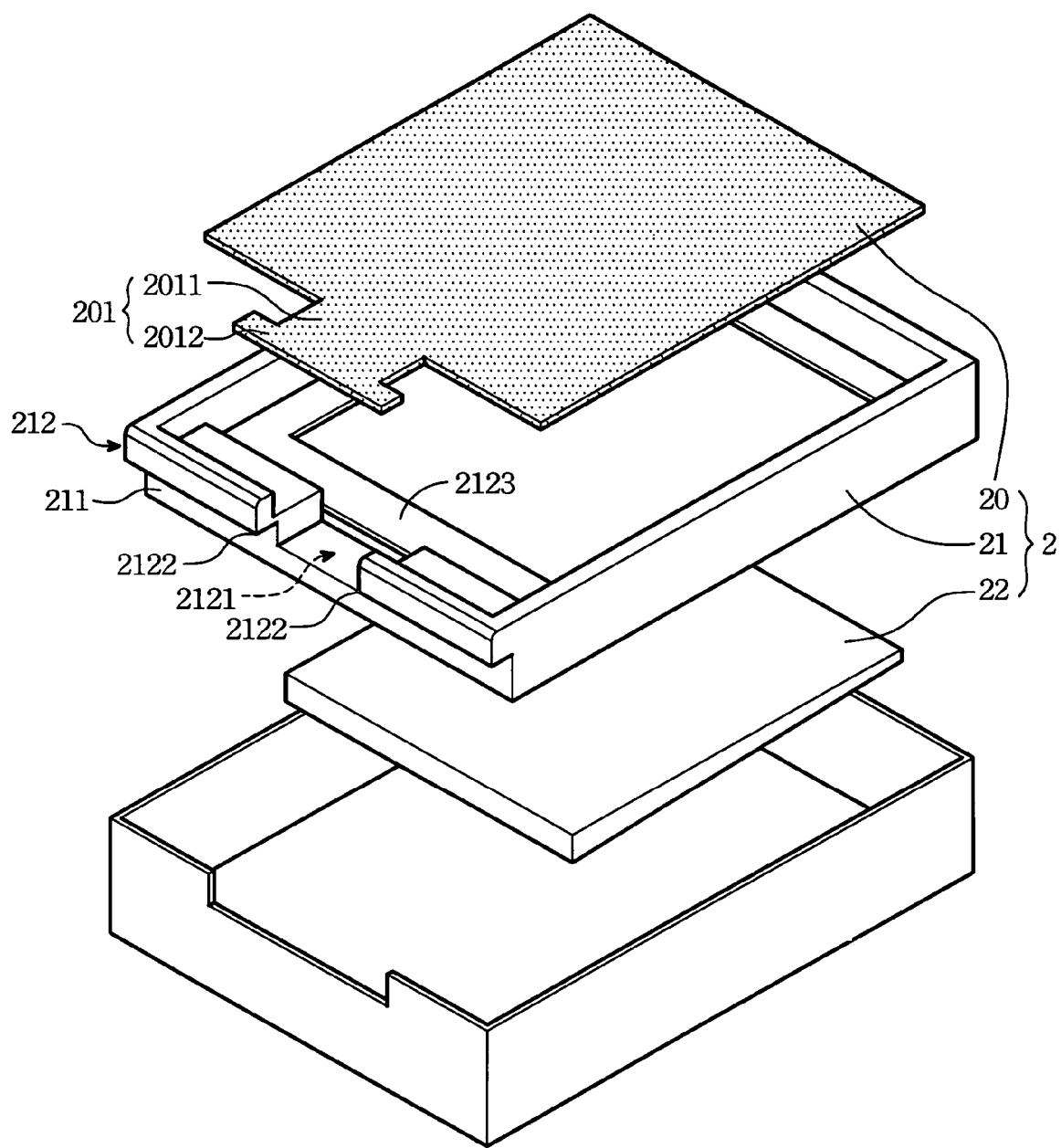
FIG. 4 illustrates an exploded schematic view of a first embodiment of an optical module according to the present invention.

FIG. 4 illustrates an exploded schematic view of an embodiment of an optical module of the present invention.

The optical module in FIG. 4 comprises an optical film 20 and a positioning frame 21, wherein the optical film 20 can be any optical films such as diffusion film, prism film, protecting film, etc, and has a first lug 201 on one side thereof, the first lug comprises a base portion 2011 and an expansion portion 2012 extending outwardly. The expansion portion 2012 is wider than the base portion 2011. The first lug 201, for instance, has an "L" shape or "T" shape.

The frame 21 is rectangular with four sides as the side walls with fixed thicknesses respectively. The frame 21 further has a flange 212 disposed on one of the four side walls and comprising a first opening 2121. The opening 2121 separates the flange 212 into two parts. Therefore, the flange 212 has two first protrusions 2122 extending outwardly the side wall on the two sides of the first opening 2121. The two protrusions 2122 on the two sides of the first opening 2121 are parallel each other.

In addition, the side wall 211 may further include a second protrusion 2123 extending to an inner side of the side wall 211. For the preferred embodiment, the optical module further has a light guide 22 disposed inside the positioning frame 21, and at least a portion of the edges of the light guide 22 is disposed under the second protrusion 2123.

The shape of the first opening 2121 is corresponding to the shape of the base portion 2011 of the first lug 201. The first opening 2121 is used to contain the base portion 2011 of the first lug 201 and the expansion portion 2012 of the first lug 201 can be disposed under the first protrusion 2122.

Figure 5:
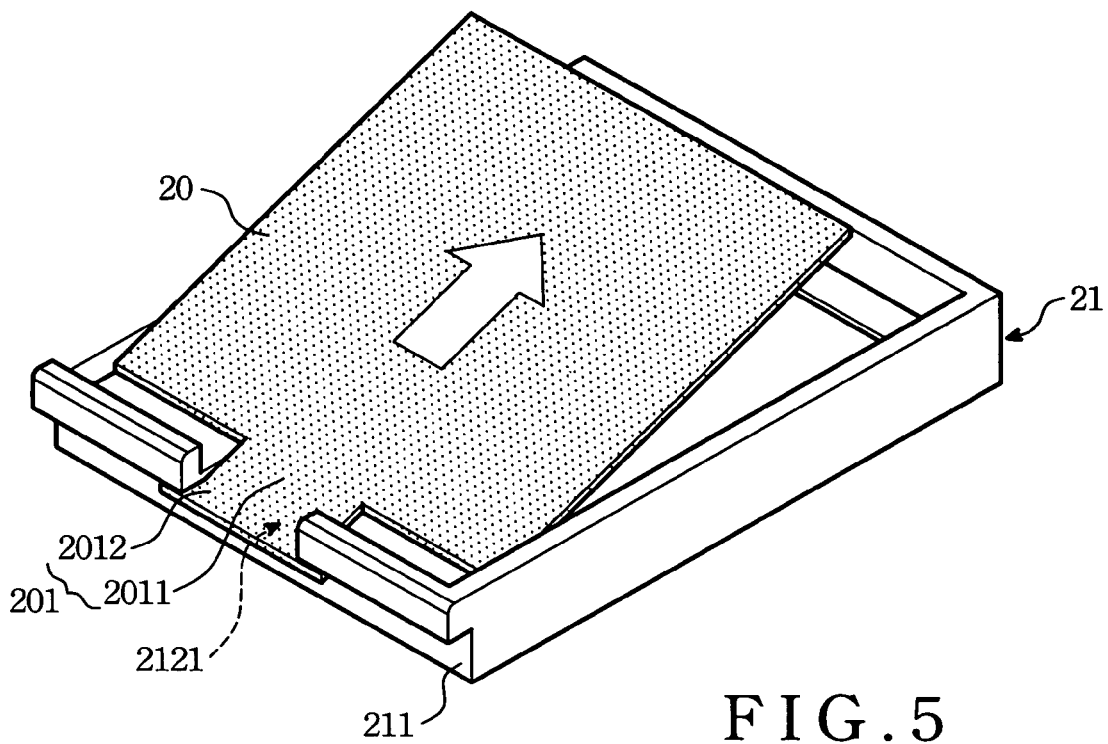
FIG. 5 illustrates a schematic view of assembling the optical film to a positioning frame according to the present invention.

FIG. 5 illustrates a schematic view of assembling the optical film to the positioning frame according to the present invention. Firstly, the base portion 2011 of the first lug 201 lodges in the first opening 2121, in the meantime the expansion portion 2012 is located outside the first opening 2121. After moving the optical film 20 along the direction shown by the arrow in FIG. 5, the expansion portion 2012 contacts closely to an outer surface of the lateral 211 because the width of the expansion portion 2012 is wider than the width of the base portion 2011. Then a clip or adhesive (not shown) may be used to fix the other side of the optical film 20 on the positioning frame 21.

Figure 6:
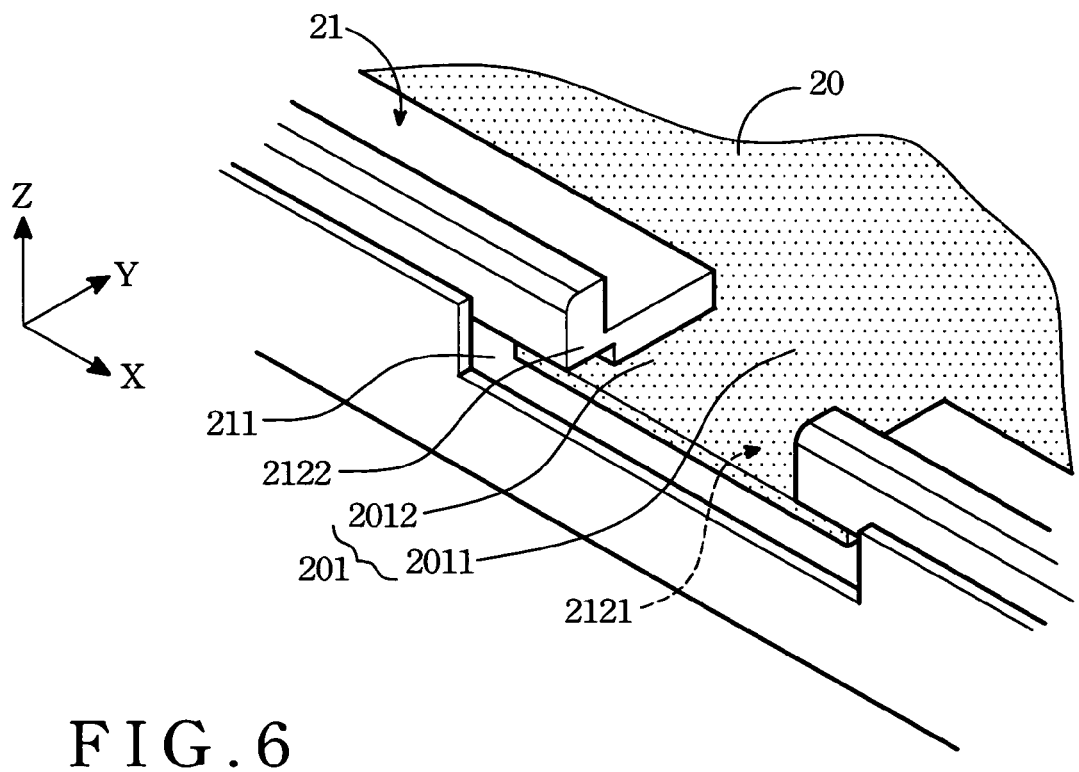
FIG. 6 illustrates an amplified schematic view of the assembled optical module of the present invention.

With reference to FIG. 6, which illustrates a close view of the assembled optical module of according to the present invention. After assembling the optical film 20 on the positioning frame 21, the optical film 20 may not move along x-axis owing to that the shape of the first opening 2121 is the same as the base portion 2011.

In addition, the first lug 201 contacts closely to the outer surface of the side wall 211 in order to restrict the movement of the optical film 20 along y-axis. Furthermore, an upper surface of the first lug 201 contacts closely to a lower surface of the first protrusion 2122 so as to restrict the movement of the optical film 20 along z-axis. Preferably another side of the optical film 20 is adhered by way of clips, adhesive, or other equivalence.

Figure 7:
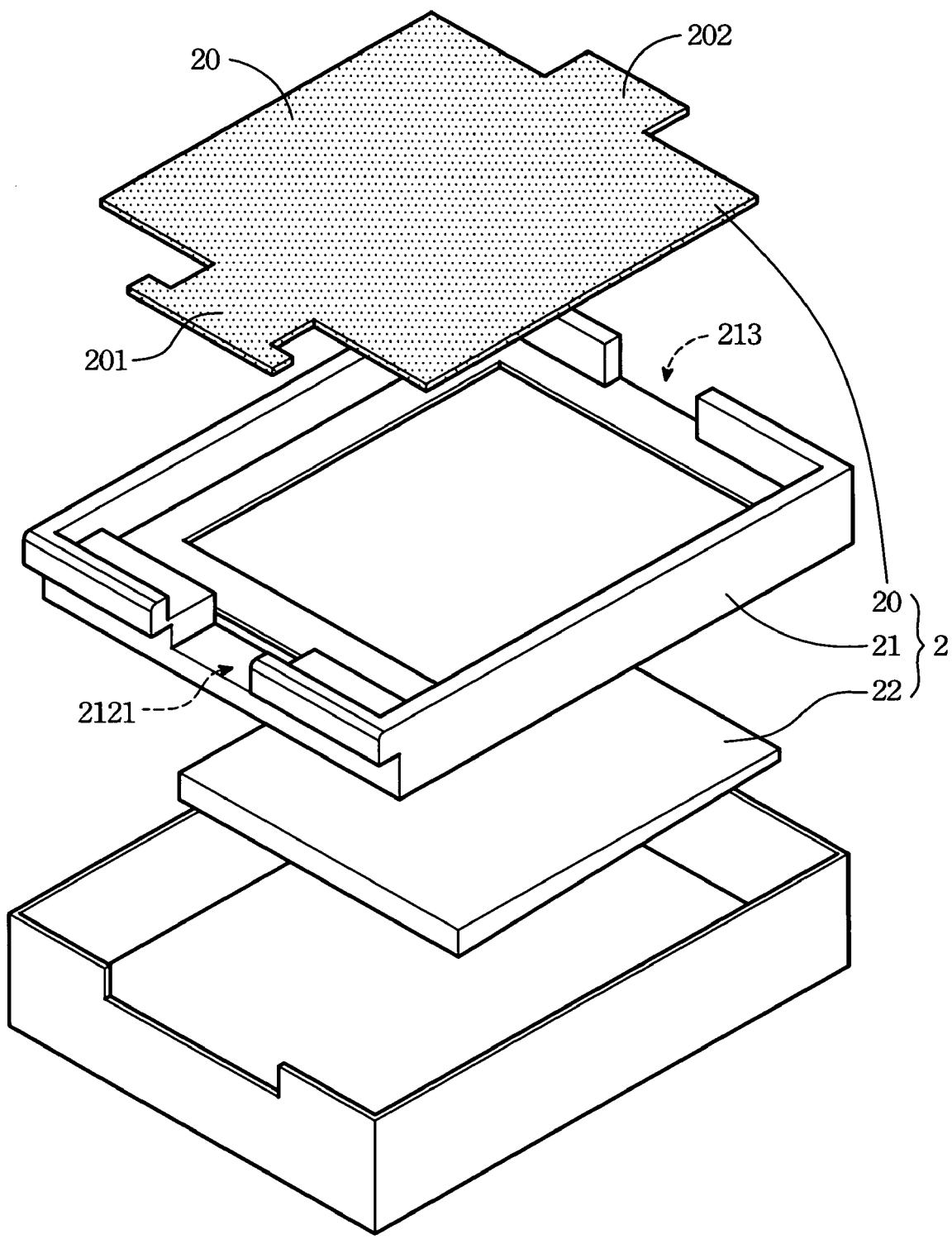
FIG. 7 illustrates a schematic view of a second embodiment of the optical module according to the present invention.

FIG. 7 illustrates a schematic view of a second embodiment of the optical module of the present invention. The optical film 20 in FIG. 7 has a second lug 202 on aside opposite to the side with the first lug, and the positioning frame 21 includes a second opening 213 on its side wall 211, the position and the shape of the second opening 213 is corresponding to the second lug 202.

Figure 8:
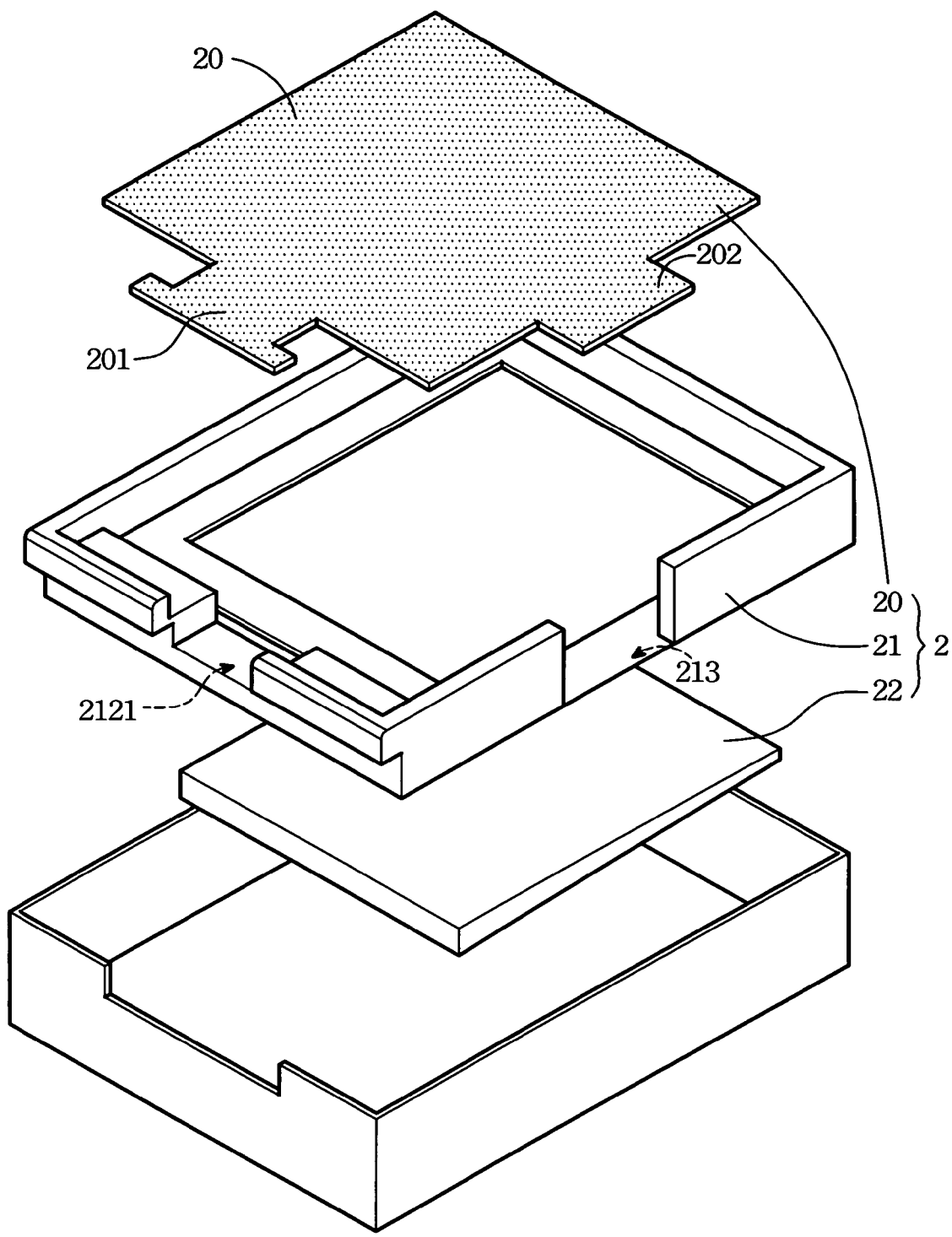
FIG. 8 illustrates a schematic view of a third embodiment of the optical module according to the present invention.

FIG. 8 illustrates a schematic view of a third embodiment of the optical module of the present invention. The second lug 202 in FIG. 8 is formed on a side adjacent to the side with the first lug 201, and the positioning frame 21 includes a second opening 213 on the side wall 211, wherein the position and the shape of the second opening 213 is corresponding to the second lug 202.

To sum up, the present invention provides an optical film and a positioning frame that can be easily and conveniently assembled, and at the same time, restricts the movement of the optical film, effectively. The present invention can also reduce the manufacturing cost and prevent the light leakage from the lugs.

Another advantage of the present invention is that only a simple die block is required to manufacture the flange on the flange on the positioning frame, and therefore it's easy to apply into practice.

While the present invention has been particularly shown and described with reference to preferred embodiments, it will be understood by those skilled in the art that various changes in form and/or detail may be made without departing from the spirit and scope of the present invention.

What is claimed is:

1. A positioning frame for accommodating an optical film having a first lug with a base portion and an extension portion, the width of the extension portion being wider than the base portion, the positioning frame comprising:
   a first side wall; and
   a flange formed on the side wall, wherein the flange has a first opening for accommodating the base portion and two first protrusions extending outwardly on the two sides of the first opening,
   wherein an upper surface of the first lug contacts closely to a lower surface of the first protrusions so as to restrict the vertical movement of the optical film.

2. The positioning frame of claim 1, wherein the side wall has a second protrusion extending to an inner side of the side wall.

3. The positioning frame of claim 2, wherein the optical film has a second lug, and a second side wall has a second opening, the shape and the position of the second opening corresponds to the second lug.

4. An optical module comprising:
   an optical film having a first lug with a base portion and an expansion portion, the expansion portion being wider than the base portion; and
   a positioning frame having
      a side wall, and
      a flange formed on the side wall, wherein the flange has a first opening for accommodating the base portion and two first protrusions extending outwardly on the two sides of the first opening,
   wherein an upper surface of the first lug contacts closely to a lower surface of the first protrusions so as to restrict the vertical movement of the optical film.

5. The optical module of claim 4, wherein the side wall has a second protrusion extending to an inner side of the side wall.

6. The optical module of claim 5 further comprising a light guide disposed inside the positioning frame and under the second protrusion.

7. The optical module of claim 4, wherein the first lug has an L shape.

8. The optical module of claim 4, wherein the first lug has a T shape.

9. The optical module of claim 4, wherein the shape of the first opening corresponds to the shape of the base portion.

10. The optical module of claim 4, wherein the optical film has a second lug, the side wall has a second opening, and the shape and the position of the second opening correspond to the second lug.

* * * * *